(12) United States Patent
Lee et al.

(10) Patent No.: US 10,958,513 B1
(45) Date of Patent: Mar. 23, 2021

(54) ESTABLISHING AN INITIAL CONFIGURATION OF A STREAMING DEVICE

(71) Applicant: Amazon Technologies, Inc., Seattle, WA (US)

(72) Inventors: Michael M. Lee, San Jose, CA (US); Nadim Awad, San Francisco, CA (US); Nagendra Bage Jayaraj, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 820 days.

(21) Appl. No.: 14/642,646

(22) Filed: Mar. 9, 2015

Related U.S. Application Data

(63) Continuation of application No. 13/525,909, filed on Jun. 18, 2012, now Pat. No. 8,977,776.

(51) Int. Cl.
*H04L 12/24* (2006.01)
*H04L 29/06* (2006.01)
*H04L 29/08* (2006.01)

(52) U.S. Cl.
CPC ...... *H04L 41/0806* (2013.01); *H04L 65/1059* (2013.01); *H04L 67/303* (2013.01)

(58) Field of Classification Search
CPC ......... H04L 29/06482; H04L 29/06489; H04L 29/06496; H04L 29/0651; H04L 41/0806; H04L 65/1059; H04L 65/604; H04L 65/607; H04L 67/303; H04L 67/306
See application file for complete search history.

(56) References Cited

U.S. PATENT DOCUMENTS

| | | | |
|---|---|---|---|
| 5,596,423 A | 1/1997 | Pritchard | |
| 6,144,400 A * | 11/2000 | Ebisawa | H04N 7/17318 348/E7.071 |
| 6,463,467 B1 * | 10/2002 | Mages | G06F 21/10 375/E7.025 |
| 6,549,902 B1 | 4/2003 | Iwai | |
| 6,668,324 B1 | 12/2003 | Mangold et al. | |
| 6,714,937 B1 * | 3/2004 | Eynon | G06Q 10/06 705/26.5 |
| 7,970,820 B1 | 6/2011 | Sivasubramanian et al. | |

(Continued)

*Primary Examiner* — Lance Leonard Barry
(74) *Attorney, Agent, or Firm* — Eversheds Sutherland (US) LLP

(57) ABSTRACT

Described herein are systems and methods for content streaming with bandwidth management. Prior to shipment of a streaming device, partial content and remaining content from content may be generated. The partial content may be configured to be unusable for presentation at the streaming device without at least a portion of the remaining content, and the remaining content may be configured to be unusable for presentation at the streaming device without at least a portion of the partial content. The partial content may be combinable with the remaining content by the streaming device to form a presentable file corresponding to the first content. The partial content may have a filename extension indicating that an associated media file includes the partial content, and the associated media file is different from the presentable file. The partial content on the streaming device may be stored prior to the shipment of the streaming device.

20 Claims, 10 Drawing Sheets

(56) References Cited

U.S. PATENT DOCUMENTS

| | | | |
|---|---|---|---|
| 8,015,306 B2 | 9/2011 | Bowman | |
| 8,060,561 B2 | 11/2011 | Sivasubramanian et al. | |
| 9,065,813 B2* | 6/2015 | Kolavennu | H04W 76/14 |
| 9,717,982 B2* | 8/2017 | Quinn | A63F 13/00 |
| 2001/0029584 A1* | 10/2001 | Van De Haar | H04N 7/165 |
| | | | 713/193 |
| 2002/0169675 A1* | 11/2002 | Helot | G06Q 10/087 |
| | | | 705/27.2 |
| 2003/0093530 A1 | 5/2003 | Syed | |
| 2004/0128145 A1* | 7/2004 | Sato | G06F 21/10 |
| | | | 705/1.1 |
| 2004/0140987 A1* | 7/2004 | Howell, Jr. | G06Q 10/087 |
| | | | 715/700 |
| 2007/0037557 A1 | 2/2007 | Shao et al. | |
| 2007/0300222 A1* | 12/2007 | Sincaglia | H04N 7/17318 |
| | | | 718/1 |
| 2008/0010653 A1 | 1/2008 | Ollikainen et al. | |
| 2008/0141304 A1 | 6/2008 | Otsu et al. | |
| 2008/0239909 A1* | 10/2008 | Takahashi | G11B 20/00086 |
| | | | 369/53.21 |
| 2009/0157792 A1* | 6/2009 | Fiatal | G06Q 30/04 |
| | | | 709/201 |
| 2009/0254857 A1* | 10/2009 | Romine | G06Q 20/20 |
| | | | 715/810 |
| 2009/0259481 A1* | 10/2009 | Dandekar | G06Q 20/20 |
| | | | 705/16 |
| 2009/0328227 A1* | 12/2009 | Cook | G06F 21/16 |
| | | | 726/26 |
| 2010/0076818 A1* | 3/2010 | Peterson | G06Q 30/02 |
| | | | 705/59 |
| 2010/0169154 A1* | 7/2010 | Kraft | G06Q 30/02 |
| | | | 705/7.29 |
| 2010/0223392 A1* | 9/2010 | Pond | H04N 21/23424 |
| | | | 709/231 |
| 2012/0045054 A1 | 2/2012 | Main et al. | |

\* cited by examiner

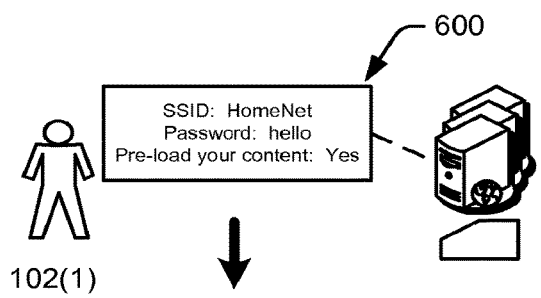
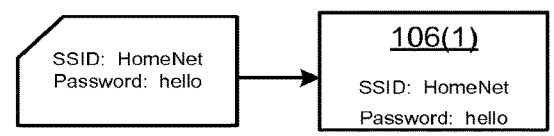
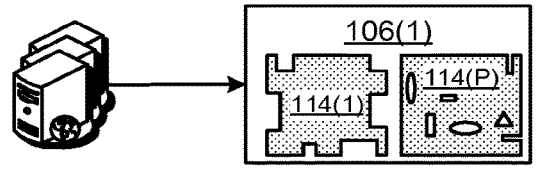
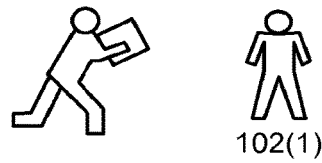
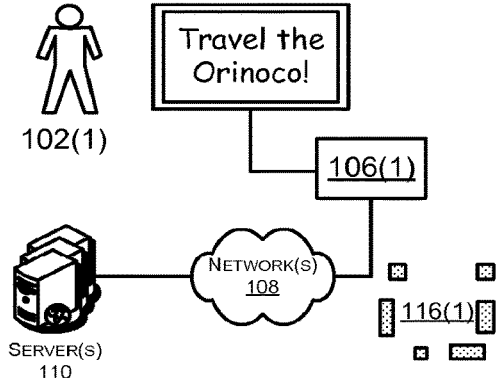

602 — DETERMINE INITIAL CONFIGURATION AND CONTENT TO PRELOAD ONTO A STREAMING DEVICE

604 — CONFIGURE THE STREAMING DEVICE WITH THE INITIAL CONFIGURATION

606 — BASED AT LEAST IN PART ON THE CONTENT, PRELOAD PARTIAL CONTENT ONTO THE STREAMING DEVICE

608 — TRANSFER THE STREAMING DEVICE TO A USER

610 — USER RECEIVES AND ACTIVATES THE STREAMING DEVICE TO PRESENT CONTENT USING THE PRELOADED PARTIAL CONTENT

FIG. 6

_ESTABLISHING AN INITIAL CONFIGURATION OF A STREAMING DEVICE_

RELATED APPLICATION

This patent application is a continuation of U.S. patent application Ser. No. 13/525,909, issued as U.S. Pat. No. 8,977,776, filed on Jun. 18, 2012, which is hereby incorporated by reference in its entirety.

BACKGROUND

A wide variety of content is available for consumption by users via streaming over a network. This content may include books, music, video, and so forth. Users seek to access this content at home, while travelling, and so forth. However, increasing demands for higher quality content, such as high-definition audio and video, combined with increasing network congestion as many users access these and other services, may result in poor customer experiences while accessing this content.

BRIEF DESCRIPTION OF THE DRAWINGS

FIG. 6 illustrates a scenario of configuring the streaming device and preloading partial content prior to delivery in accordance with an embodiment of the disclosure.

Figure 1:
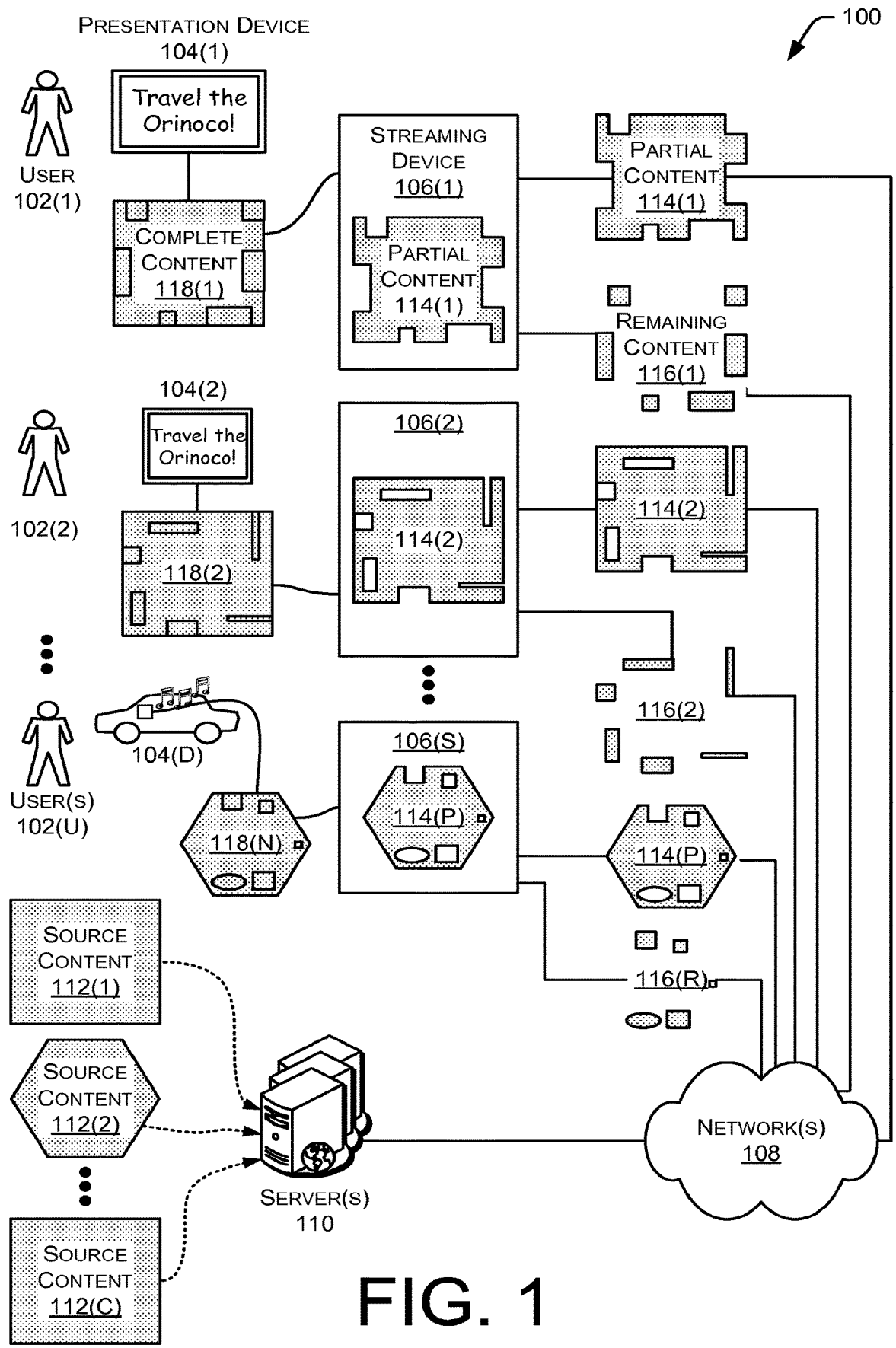
FIG. 1 illustrates a system for generating and delivering streaming content in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A wide variety of content such as books, music, videos, and so forth is available for consumption. Users may access the content stored on one or more other devices such as servers via a network such as the Internet. Traditional systems have either involved the user downloading a file storing the content or streaming the content.

Downloading requires the file to be complete prior to presentation, which may take significant amounts of time particularly when the network connection has minimal throughput. Downloading also increases the risk of an attacker gaining access to a complete piece of content and potentially redistributing that compromised piece of content.

Streaming allows for presentation to begin by sending sequential portions of the content for presentation. Streaming allows the rendering of that content to begin more quickly than with downloading, but may be adversely impacted by changing network conditions. As the popularity of streaming media increases, the network may be unable to sustain streaming in such a way that a desired customer experience is maintained. For example, a decrease in network throughput during streaming may result in degradation or loss of the presentation resulting in user frustration.

Described herein are devices and methods for intelligent content streaming with bandwidth management. A server may store source content, such as movies, music, books, and so forth. A delivery schedule is determined based on one or more delivery parameters. Based at least in part on that delivery schedule, the server generates and provides to a streaming device partial content in advance of presentation. The streaming device stores the partial content in a secondary memory of the streaming device for later use. The secondary memory or mass storage may comprise flash memory, hard drive, and so forth, configured to maintain data stored therein without application of power.

The partial content comprises an incomplete representation of the source content. Complementary to the incomplete representation of the partial content is remaining content. When combined, the partial content and the remaining content form complete content which may be presented. The partial content and the remaining content are each configured to be unusable for presentation without at least a portion of the other.

When presentation of the content is requested, the server streams the remaining content to the streaming device. A portion of the streamed remaining content may be temporarily stored at the streaming device in primary memory, such as random access memory. At the streaming device, the remaining content is combined with the partial content to generate the complete content. The complete content may then be presented via a presentation device such as a television, audio appliance, and so forth.

The partial content may comprise a significant portion of the total data used to deliver the complete content. For example, the partial content may comprise 80% of the complete content as presented, while the remaining content comprises 20%. As a result, a significant decrease in required network throughput is realized when compared to streaming the entire complete content. Thus, during times when the network is congested, users are able to access content without experiencing degradation in quality, loss of presentation, and so forth. Additionally, the server may be able to handle more customers simultaneously during peak periods.

Illustrative System

FIG. 1 illustrates a system 100 for generating and delivering streaming content. One or more users 102(1), 102(2), ... 102(U) may be presented content by one or more presentation devices 104(1), 104(2), ... 104(D) coupled to, or incorporating, one or more streaming devices 106(1), 106(2), . . . 106(S). As used herein, letters enclosed by parenthesis such as "(U)" or "(D)" indicate an integer having a value greater than zero.

The presentation devices 104 may include smartphones, tablet computers, televisions, audio appliances, and so forth. The streaming devices 106 may comprise smartphones, tablet computers, televisions, audio appliances, laptop computers, desktop computers, set-top boxes, game consoles, in-vehicle entertainment systems, and so forth. In some implementations, the presentation device 104 and the streaming device 106 may be incorporated into a common device. For example, a television 104(1) may have an integrated streaming device 106, or vice versa. The presentation device 104 and the streaming device 106 may be configured to be portable, such as in a handheld unit or an in-vehicle entertainment system.

The presentation devices 104, the streaming device 106, or both may be configured to couple via a communication interface to one or more networks 108. The network 108 may comprise one or more private networks, public networks such as the Internet, or a combination of both configured to transfer data between two or more devices. In some implementations, a plurality of the streaming devices 106 may form a wireless mesh network with one another to allow for sharing of resources and data. This is discussed in more detail below with regard to FIG. 2.

One or more servers 110 are coupled to the network 108. The server 110 is configured to store or access source content 112(1), 112(2), . . . , 112(C). The source content 112 may comprise movies, audio files, books, and so forth. The source content 112 may be configured to be presented on the presentation device 104. For example, the source content may comprise a video file encoded with the Motion Picture Experts Group (MPEG) 4 standard.

The source content 112 may comprise one or more files. For ease of illustration and not by way of limitation, the source content 112 is described in this disclosure as a single file.

The server 110 is configured to schedule and deliver partial content 114 and stream remaining content 116 to the streaming devices 106 for eventual output as complete content 118 to the presentation device 104. As used herein, "streaming" indicates that an ongoing transfer of data is contemporaneous with presentation. While data being streamed may be temporarily stored in primary storage of the streaming device 106, such as for buffering purposes, the contents of an entire streaming session are not retained. In some implementations one or more portions of the remaining content 116 may be designated with a pre-determined time to expire, a timestamp, or a lifespan. This designation may be part of a flag, attribute, encryption key, and so forth. For example, segments or blocks of the remaining content 116 may be configured such that they are usable only for fifteen minutes after delivery. After that fifteen minute period, the remaining content 116 may be unusable, and that portion of the remaining content 116 would need to be provided again by the server 110 for presentation of complete content 118 to occur.

The partial content 114 comprises an incomplete representation of the source content 112. By way of analogy and not as a limitation, the source content 112 may comprise a picture, and the partial content 114 may be a jigsaw puzzle of that picture which has pieces omitted, resulting in gaps in the picture.

The remaining content 116 may be considered to comprise data which is complementary to the incomplete representation found in the partial content 114. When combined, the partial content 114 and the remaining content 116 as streamed form complete content 118 which may be presented. Continuing the analogy, the remaining content 116 provides the missing pieces of the jigsaw puzzle and is used to fill in and complete the picture.

The partial content 114 provided to different streaming devices 106, or to the same streaming device 106 for different users, which is based on the same source content 112, may vary. For example, as shown here users 102(1) and 102(2) would like to watch source content 112(1) which is a movie entitled "Travel the Orinoco!" The server 110 has previously provided, such as during a period of high network throughput during early morning hours, partial content 114 for this movie. However, even though based on the same source content 112(1), the partial content 114(1) and 114(2) differ from one another. During a request by the users 102(1) and 102(2) to present the completed content 118(1) and 118(2) on the respective presentation devices 104(1) and 104(2), the server 110 provides corresponding remaining content 116(1) and 116(2) to the respective streaming devices 106(1) and 106(2).

The delivery of the partial content 114 may take place as one or more connection sessions. For example, delivery of the partial content 114 may begin, but may be suspended or terminated, such as when network throughput drops below a pre-determined level. When conditions improve, the delivery may resume or start again. The delivery may continue at a later time, until the entire partial content 114 is delivered. In one implementation, presentation of content may not be available until the partial content 114 is completely delivered. In another implementation, presentation may begin using a portion of the partial content 114 combined with the streamed remaining content 116.

The partial content 114 is configured to be unusable for presentation without at least a portion of the remaining content 116. Likewise, the remaining content 116 is unusable for presentation without at least a portion of the partial content 114. The partial content 114 may not be recognizable by a file system of the streaming device 106 as even being a particular media file. For example, the partial content 114 for different types of media may use a common filename extension indicating that the files contain partial content 114, but not that a particular file contains audio, video, and so forth. Generation of the partial content 114 is described below in more detail with regard to FIG. 9.

The partial content 114 may be pre-generated by the server 110 from the source content 112, or generated on demand. For example, the partial content 114(1) may be generated in advance of a scheduled delivery to the streaming device 106. The server 110 is discussed below in more detail with regard to FIG. 3.

Figure 2:
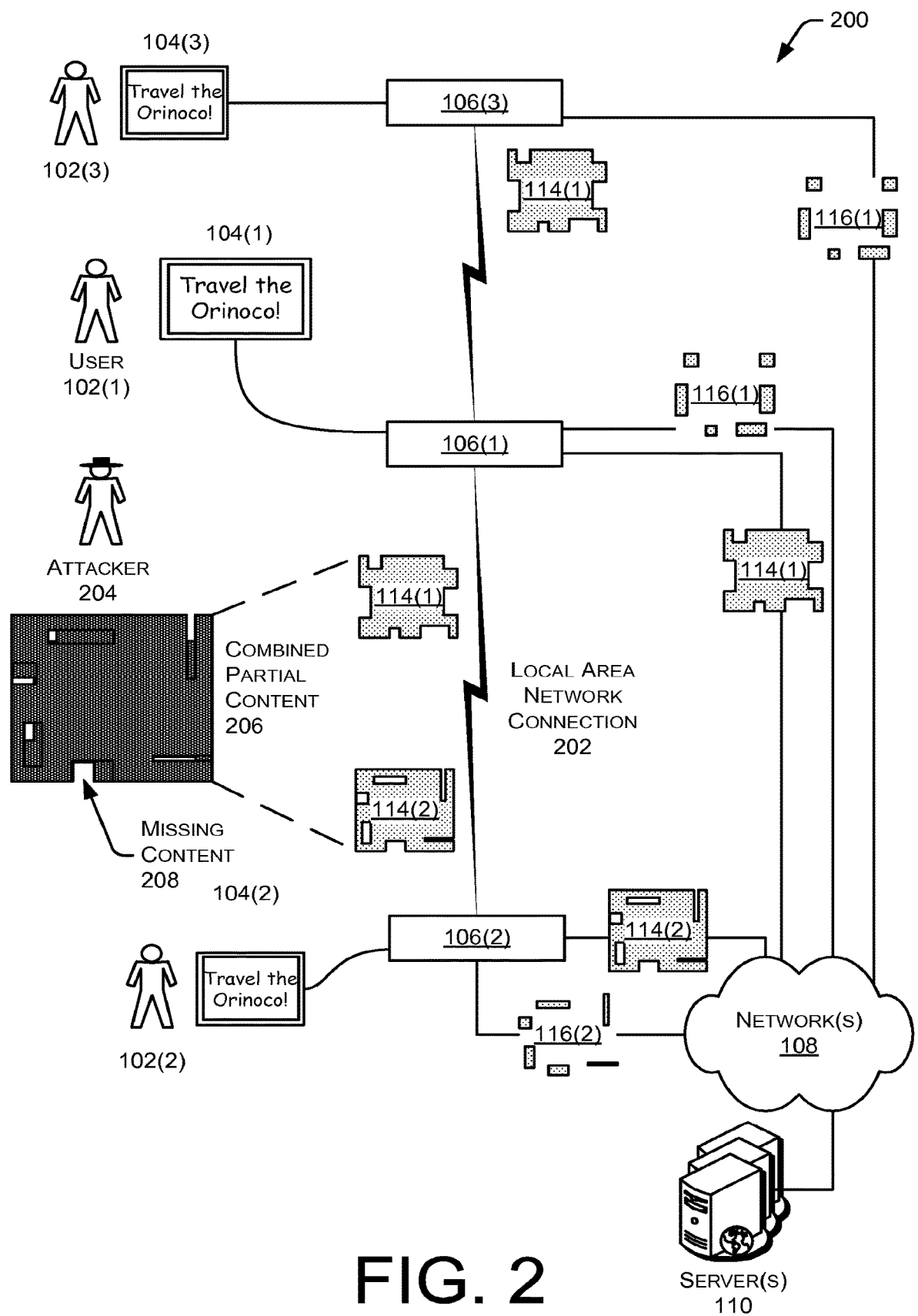
FIG. 2 illustrates transfers of partial content between devices in accordance with an embodiment of the disclosure.

FIG. 2 illustrates transfers 200 of the partial content 114 between streaming devices 106 and the servers 110. In some implementations, the streaming devices 106 may be configured to communicate with one another and form local area network ("LAN") connections 202. For example, the streaming devices 106 in homes throughout a neighborhood may be configured to communicate via a wireless LAN interface with one another to form a local area network. Via this LAN connection 202, in some implementations, partial content 114 present on a first streaming device 106(1) may be shared with one or more other streaming devices 106(1)-106(S).

Where this LAN connection 202 is available, the users 102 may benefit by being able to call for presentation of the particular piece of content which is unavailable on their devices but available elsewhere on the LAN. For example, as depicted here, the server 110 has provided partial content 114(1) for the movie "Travel the Orinoco!" to the streaming device 106(1). When the user 102(3) wishes to watch this movie, the server 110 may coordinate a transfer of the partial content 114(1) via the LAN connection 202 from the streaming devices 106(1) to 106(3). When the user 102(3) chooses to watch the content, the server 110 provides the remaining content 116(1) appropriate to the partial content 114(1) to the streaming device 106(3) which is combined to create the complete content 118(1). As described below with regard to FIG. 10, the partial content 114(1) may be modified during presentation to form new partial content 114(4).

As mentioned above, in some implementations, the same source content 112 may be used to generate partial content 114(1) and 114(2) which differ from one another. The partial content 114(1) may be delivered to the streaming device 106(1) and the partial content 114(2) may be delivered to another streaming device 106(2). As described above, the presentation calls for streaming the remaining content 116(1) and 116(2) from the server 110 to the respective streaming devices 106(1) and 106(2).

Should an attacker 204 gain access to the partial content 114, in some implementations, the partial content 114 may be configured such that even when combining multiple pieces of partial content 114, an incomplete representation of the source content 112 remains. For example, combined partial content 206 as shown here comprises the partial content 114(1) and 114(2), both representative of the same source content 112(1). Even when combined, missing content 208 remains. Varying the geographic and logical distribution of the partial content 114, varying the generation of the partial content 114, and using other combinations will not reconstruct a representation of the original content 112. As a result, overall security of the content may be improved.

In some implementations, the partial content 114 and the remaining content 116 may be delivered via different networks 108. For example, the partial content 114 may be transferred to the streaming device 106 via a broadband Internet connection located at a residence or business. When the streaming device 106 is away from those locations, the remaining content 116 may be provided via a different network such as a cellular data network. As a result, the content may still be accessible to users 102 while mobile while still retaining the security and content control available with streaming.

Figure 3:
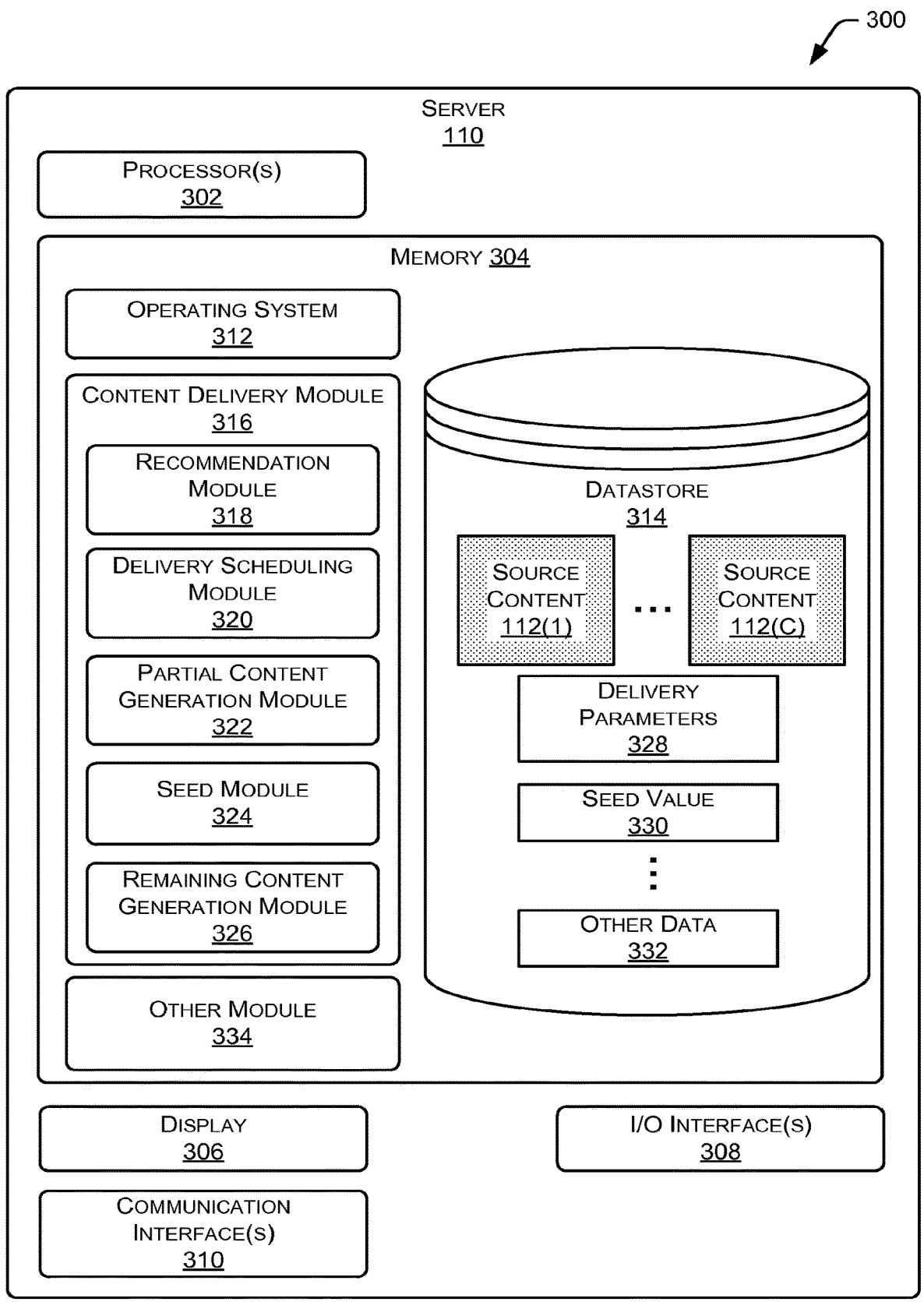
FIG. 3 illustrates a block diagram of a server configured to generate partial content and remaining content in accordance with an embodiment of the disclosure.

FIG. 3 illustrates a block diagram 300 of the server 110 configured to generate partial content 114 and remaining content 116. The server 110 may comprise one or more processors 302, one or more memories 304, one or more displays 306, one or more input/output ("I/O") interfaces 308, and one or more communication interfaces 310.

The processor 302 may comprise one or more cores and is configured to access and execute at least in part instructions stored in the one or more memories 304. The one or more memories 304 comprise one or more computer-readable storage media ("CRSM"). The one or more memories 304 may include, but are not limited to, random access memory ("RAM"), flash RAM, magnetic media, optical media, and so forth. The one or more memories 304 may be volatile in that information is retained while providing power or non-volatile in that information is retained without providing power.

The display 306 is configured to present visual information to the user 102. The one or more I/O interfaces 308 may also be provided in the server 110. These I/O interfaces 308 allow for coupling devices such as keyboards, external memories, and so forth, to the server 110.

The one or more communication interfaces 310 provide for the transfer of data between the server 110 and another device, such as via the network 108. The communication interfaces 310 may include, but are not limited to, wired local area networks ("LANs"), wireless local area networks ("WLANs"), wireless wide area networks ("WWANs"), and so forth.

The one or more memories 304 may store code or program instructions for execution by the processor 302 to perform certain actions or functions. These instructions may include an operating system 312 configured to manage hardware resources such as the I/O interfaces 308 and provide various services to applications executing on the processor 302. The one or more memories 304 may also store a datastore 314 containing information about the operating system 312, configuration files, source content 112(S), and so forth.

A content delivery module 316 may be stored in the memory 304. The content delivery module 316 is configured to provide a representation of the source content 112 for use by the users 102 such as by delivering the partial content 114, streaming the remaining content 116, and so forth. The content delivery module 316 may comprise a recommendation module 318, a delivery scheduling module 320, a partial content generation module 322, a seed module 324, and a remaining content generation module 326.

The recommendation module 318 is configured to select source content 112 which may be of interest to the user 102 for later presentation. The recommendation module 318 may receive user input from the user 102, such as entry of a queue of content which the user 102 would like to have presented. The recommendation module 318 may also generate recommendations for content of potential interest by utilizing one or more of user demographics, usage trends, purchase history for goods and services, previous content consumed, or other factors or information.

Once source content 112 has been determined, the delivery scheduling module 320 may be configured to provide the partial content 114 associated with that source content 112. As described above, by providing the partial content 114 to the streaming device 106 before presentation, network resource consumption is reduced during presentation of the complete content 118 by the presentation device 104. The delivery scheduling module 320 may be based on one or more delivery parameters 328. These delivery parameters 328 may be stored in the datastore 314. In some implementations, the delivery parameters 328 may be assessed by the delivery scheduling module 320 to determine what partial content 114 will be delivered at what times and via what networks 108.

The partial content generation module 322 is configured to generate the partial content 114. The partial content generation module 322 may generate partial content 114 at least in part by omitting a plurality of portions from the source content 112. This omission may occur during delivery, during a transfer or copy operation, and so forth. For example, during the data transfer in which the partial content 114 is delivered to the streaming device 106, the partial content generation module 322 may omit from transmission a plurality of portions of the data, thus generating the partial content 114. These omissions may be irregularly or unevenly dispersed throughout the partial content 114 relative to the source content 112. The omitted portions may also have variable bit lengths. For example, one omitted section may be 3 kbits while another section may be 21 bits.

In some implementations, the partial content generation module 322 may insert obfuscation data in place of at least a portion of the omitted plurality of portions. Continuing the example, the 3 kbits and 21 bits omitted above may be replaced with dummy data or data from other source content 112.

In another implementation, the plurality of portions may be encrypted rather than omitted. This encryption may be such that the data is not intended for decryption. For example, a one way cipher or hashing algorithm based on a random value may be used to scramble the plurality of portions.

The partial content generation module 322 is configured to generate for delivery data in a format which may be stored in the secondary memory of the streaming device 106 but which remains useless for presentation without the complementary stream of the remaining content 116. In some implementations, the partial content 114 may also be encrypted.

The partial content generation module 322 may designate the plurality of portions using one or more seed values 330. The seed values 330 may be used as at least one input for a process which selects portions of the source content 112 for omission, inclusion, or both. The seed values 330 may be generated, managed, and so forth by the seed module 324. The seed module 324 accepts at least a portion of the inputs to the seed value generation process delivery parameters such as the user 102 account or streaming device 106 identifier, and so forth. For example, the seed values 330 associated with the source content 112(1) may vary based on the streaming device 106 to which the partial content 114 may be delivered. As a result, as described above with regard to FIG. 2, the same source content 112(1) may result in different partial content 114(1) and 114(2), each formed based at least in part on different seed values 330. The seed module 324 may contain one or more random number generators, pseudo-random noise generators, and so forth.

The remaining content generation module 326 is configured to generate the remaining content 116 which is complementary to the partial content 114. In some implementations, the remaining content 116 may be generated before streaming to the streaming device 106 begins. Where the partial content 114 is generated using the seed value 330, the remaining content generation module 326 may also use the seed value 330 to generate the remaining content 116. In another implementation, the remaining content generation module 326 may be configured to compare the partial content 114 or a portion thereof with the source content 112 to determine portions which differ, and then provide the portions which differ as the remaining content 116.

Other modules 334 may also be stored in the memory 304. For example, a user interface module may be configured to provide a user interface such that content providers may upload the source content 112 to the server 110. The datastore 314 may also store other data 332 such as encryption keys used to additionally encrypt data such as the partial content 114, the remaining content 116, and so forth.

Figure 4:
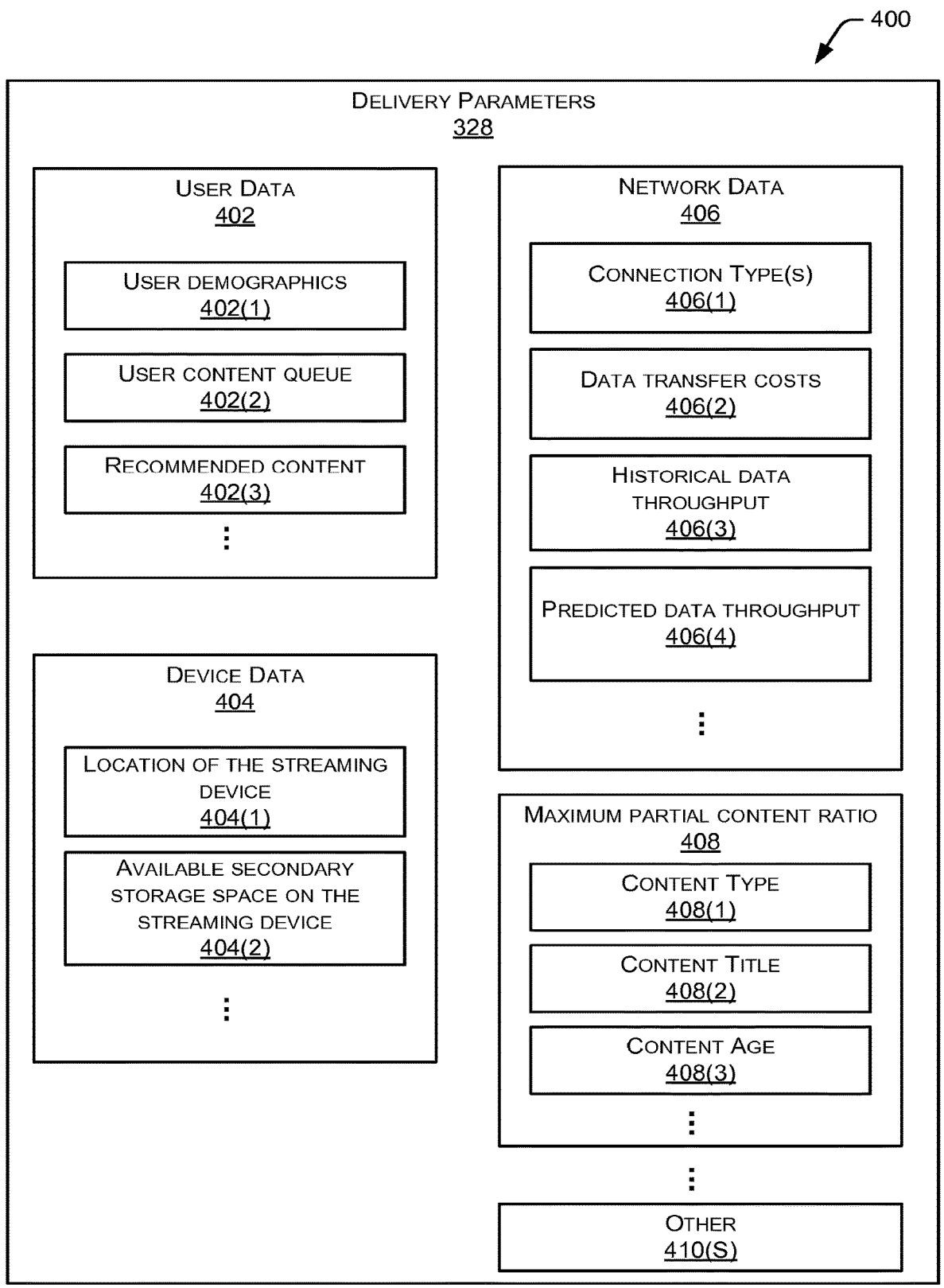
FIG. 4 illustrates a block diagram of delivery parameters which may be used to determine partial content for delivery to a streaming device in accordance with an embodiment of the disclosure.

FIG. 4 illustrates a block diagram 400 of the delivery parameters 328 which may be used by the content delivery module 316 to determine the partial content 114 for delivery to the streaming device 106, how the partial content 114 is configured, how the partial content 114 is to be generated, when to deliver the partial content 114, and so forth.

User data 402 provides information about the users 102. This user data 402 may include user demographics 402(1) such as age, employment, income, place of residence, language preferences, and so forth. The user data 402 may also include a user content queue 402(2) where the user 102 has specified or accepted recommendations for content of interest. The user data 402 may also include recommended content 402(3), such as that generated by the recommendation module 318 or provided by other users 102. The user data 402 may include other information as well such as credits available on an account for purchase of content access, and so forth. The user data 402 may be used by the content delivery module 316 for several purposes, such as generating recommendations, controlling access to the source content 112, and so forth.

Device data 404 may be accessed by the content delivery module 316. The device data 404 provides information about the streaming device 106. The device data 404 may include a location of the streaming device 404(1). This location may be determined based on network information such as identifying a location associated with a particular internet protocol address from presence of adjacent wireless networks, from cellular network data, from a global positioning system receiver, from manual user input, and so forth. Available secondary storage space on the streaming device 404(2) may be stored. For example, the streaming device 106 may be determined to have 11 gigabytes of space available. As a result, the delivery scheduling module 320 and the partial content generation module 322 may be configured to provide partial content 114 which does not exceed 11 gigabytes of storage space. Other device data such as software version and so forth may also be stored.

The delivery parameters 328 may include network data 406. The network data 406 provides information associated with connectivity via the networks 108. The content delivery module 316 may use the network data 406 to determine information such as times of peak network usage when throughput is low due to network congestion. This data may be used such that the partial content 114 is delivered during off-peak hours, such as very early in the morning when the network 108 is lightly loaded and thus higher throughput rates are available. This is discussed below in more detail with regard to FIG. 7.

The network data 406 may also be used, at least in part, to determine a partial content ratio. The partial content ratio is defined as an amount of source content 112 delivered as partial content 114 divided by the source content 112. This amount may be expressed as bits, bytes, time, chapters, sections, blocks, and so forth. For example, where the source content 112 is 10 gigabytes in length, and the partial content 114 delivered to the streaming device 106 is 8 gigabytes, the partial content ratio is 8/10 or 0.80. The partial content ratio may be increased such that during time periods of expected use when the remaining content 116 would be streamed and the network data 406 indicates the network 108 is congested, the presentation of the complete content 118 may continue. Said another way, the partial content ratio may be adjusted such that the remaining content 116 provided during streaming will transit the congested network 108 during a period of peak usage when throughput is reduced.

The network data 406 may include connection types 406(1). For example, the connection type 406(1) may be a very high bandwidth wired connection, or a cellular WWAN connection. Data transfer costs 406(2) may be considered. For example, a wired connection may have one pricing structure for data delivery while the cellular WWAN has another more costly pricing structure.

Historical data throughput 406(3) to the streaming device 106, or between the streaming device 106 and the server 110, may be maintained. For example, this historical data may indicate that at particular times, the network 108 is more congested than at others, thus, resulting in reduced data throughput.

The network data 406 may also include predicted data throughput 406(4). This prediction may be based on the historical data throughput 406(3), or other factors such as expected release of source content 112. For example, the predicted data throughput 406(4) may be modified to account for an anticipated release of a popular movie on a particular date.

The delivery parameters 328 may also include maximum partial content ratio 408 information. As described above, the partial content ratio is defined as an amount of source content delivered as partial content 114 divided by the source content 112. In some implementations, limits may be placed on how much of the source content 112 may be represented by the partial content 114 stored on the streaming devices 106, or the partial content ratio. For example, some content may be permitted to have a partial content ratio of up to 0.95 while other content may be permitted a maximum of 0.45.

The content delivery module 316 may thus use the maximum partial content ratio 408 to determine how to generate the partial content 114, how to deliver the partial content 114, and so forth. The maximum partial content ratio 408 may be based at least in part on a content type 408(1), content title 408(2), content age 408(3), or other factors. The content type 408(1) may indicate whether the content is a television show, a theatrical release or movie, an audio book, music, and so forth. For example, when the content type 408(1) is a television show, a greater maximum partial content ratio 408 may be permitted.

The content title 408(2) designates the particular content. For example, a particular television show which is very popular may have a maximum partial content ratio of 0.57. In comparison, another television show which is less popular may have a ratio of 0.85. Similarly, the content age 408(3) may be used at least in part to determine the maximum partial content ratio 408. Continuing the example, a television show released seven days ago may have a maximum partial content ratio of 0.37 when delivered this week, but when delivered next year that same show may have a maximum partial content ratio of 0.95.

The delivery parameters 328 may include other information 410(S) such as weather data for locations of the streaming devices 106, planned network outage data, pre-determined time to expire, a timestamp, or a lifespan for remaining content 116, and so forth. As described above, the content delivery module 316 may use the delivery parameters 328 to determine what content to deliver, how to generate partial content 114, and when to deliver the partial content 114.

Figure 5:
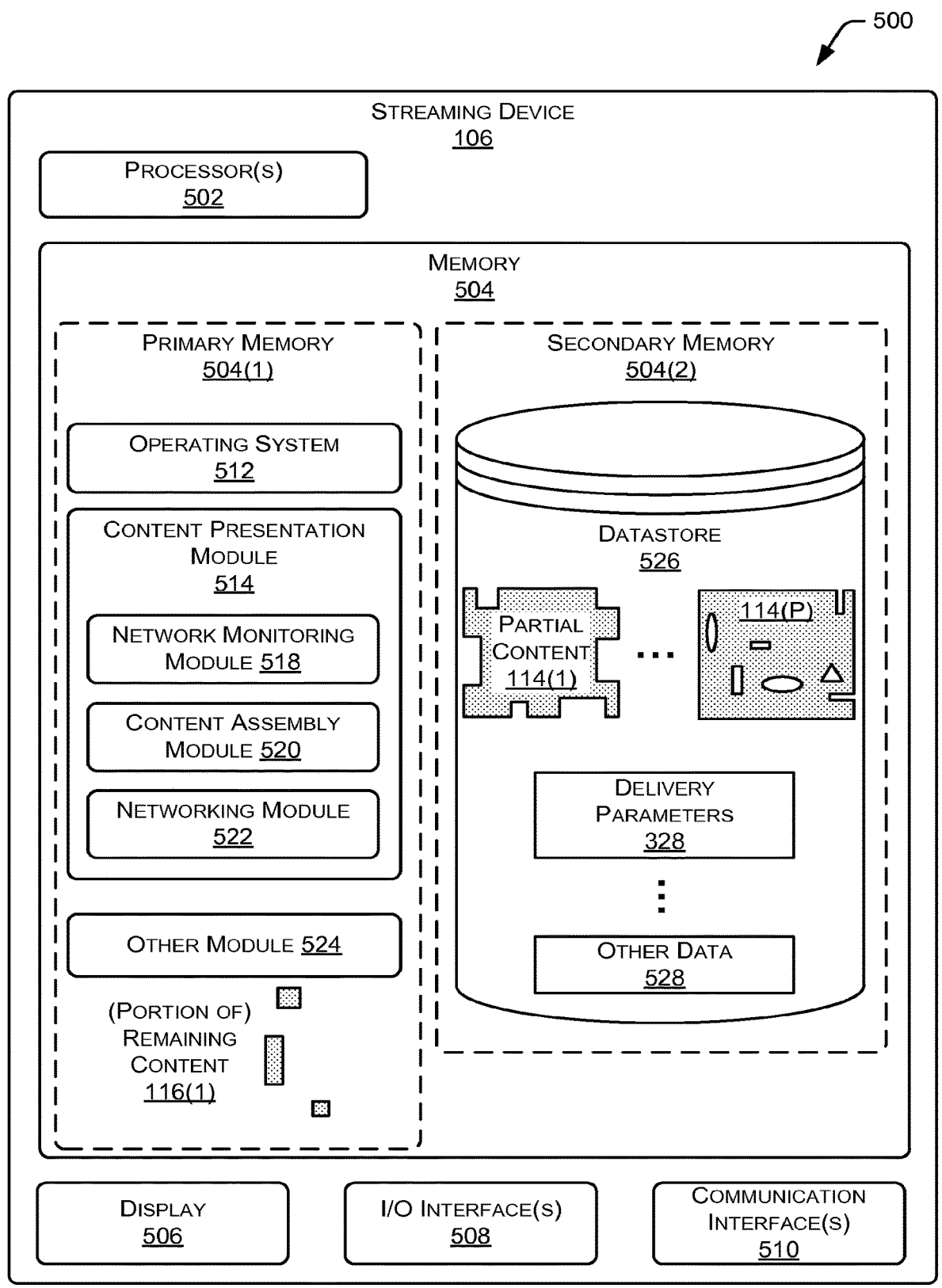
FIG. 5 illustrates a block diagram of a streaming device configured to present content in accordance with an embodiment of the disclosure.

FIG. 5 illustrates a block diagram 500 of the streaming device 106 configured to present content. Similar to the server 110 described above, the streaming device 106 may comprise one or more processors 502, one or more memories 504, one or more displays 506, one or more I/O interfaces 508, and one or more communication interfaces 510.

The memory 504 may comprise a primary memory 504(1) and a secondary memory 504(2). The primary memory 504(1) may comprise memory which is used as working memory by the streaming device 106, such as random access memory or RAM. The primary memory 504(1) may be volatile in that power is periodically applied to maintain data stored therein. In comparison, the secondary memory 504(2) provides greater storage capacity than the primary memory 504(1) and may be non-volatile. For example, the secondary memory 504(2) may comprise a hard drive, optical drive, solid state memory device, and so forth.

The primary memory 504(1) may comprise an operating system module 512 similar to that described above, a content presentation module 514, and other modules 524. During streaming and presentation, the primary memory 504(1) may store a portion of the remaining content 116 associated with the presentation of the complete content 118.

The content presentation module 514 is configured to coordinate and perform functions associated with presenting content to the user 102 and may comprise a network monitoring module 518, a content assembly module 520, and a networking module 522. The network monitoring module 518 is configured to monitor the activity of the communication interfaces 510 and the couplings to one or more of the networks 108. The network monitoring module 518 may be used to generate at least in part, or participate in the generation of, the network data 406 described above.

The content assembly module 520 is configured to access the partial content 114 and process the incoming stream from the server 110 of the remaining content 116 to provide complete content 118 to the presentation device 104.

The networking module 522 is configured to communicate with other devices such as other streaming devices 106 via the network 108. For example, the networking module 522 may access a WLAN interface of the communication interfaces 510 to communicate with adjacent streaming devices 106 to retrieve partial content 114 as described above with regard to FIG. 2.

Other modules 524 may also be present in the primary memory 504(1), such as a decryption module to decrypt content, a usage monitoring module configured to monitor interactions of the user 102 with the streaming device 106, and so forth.

The secondary memory 504(2) may store a datastore 526. The datastore 526 may be configured to store the partial content 114, at least a portion of the delivery parameters 328, and other data 528 such as decryption keys.

Illustrative Process

FIG. 6 illustrates a scenario 600 of configuring the streaming device 106. The streaming device 106 may be configured to preload partial content prior to delivery to the user 102 as described herein to improve an initial out-of-box-experience.

At 602, an initial configuration and content to preload onto a streaming device 106 is determined. For example, during purchase from an online merchant of the streaming device 106, the user 102 may enter information about a wireless network at the location where the streaming device will be used. The initial configuration may include preferred user interface settings, networking settings, account information, and so forth. In some implementations, the networking or other configuration information may be automatically retrieved or determined. Content may also be determined, such as described above with regard to the recommendation module 318.

At 604, the streaming device 106 is configured with the initial configuration. For example, the streaming device 106 is set to use the wireless network as described by the user 102.

At 606, based at least in part on the content determined, partial content 114 is preloaded onto the streaming device 106. For example, the partial content 114 from the user's 102 content queue 402(2) as well as the recommended content 402(3) may be transferred to the streaming device 106. Where no recommendations are available, a default or pre-determined set of partial content 114 may be provided. In some implementations, the preloading may be limited to a pre-determined quantity of data. This may be done to allow for deterministic scheduling of resources and movement of the streaming device 106 through the configuration and delivery process.

At 608, the streaming device 106 as configured is transferred to the user 102. For example, the user 102(1) may pick up the streaming device 106(1) from a retailer, or a carrier may deliver the streaming device 106(1).

At 610, the user 102 receives and activates the streaming device to present content using the preloaded partial content 114. Because the partial content 114 has been previously transferred and the networking settings have been previously configured, the user 102 is able to immediately enjoy the content.

Figure 7:
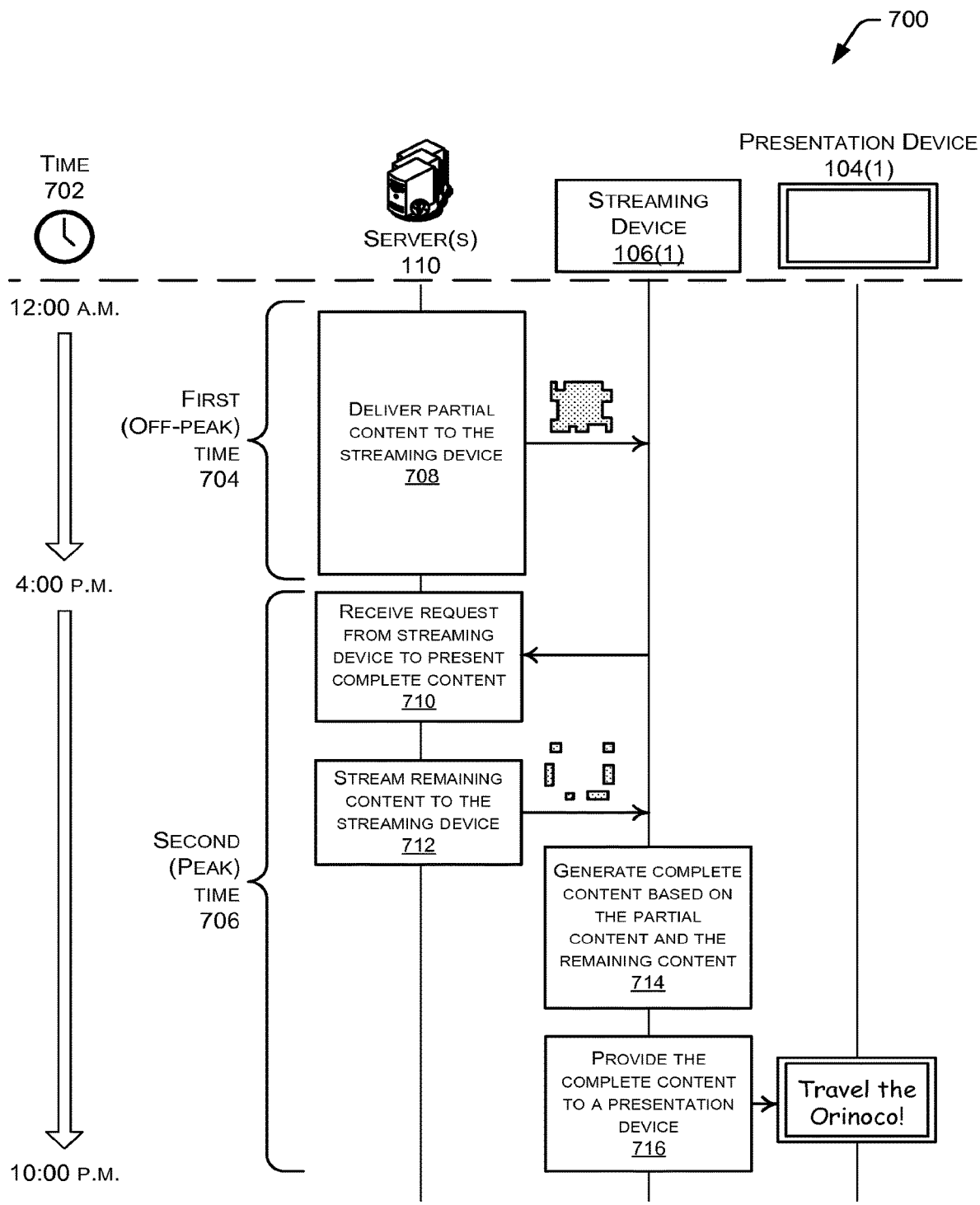
FIG. 7 illustrates delivery of partial content and streaming of remaining content to present complete content in accordance with an embodiment of the disclosure.

FIG. 7 illustrates delivery 700 of the partial content 114 and streaming of the remaining content 116. In this illustration, time is indicated by arrow 702 and increases down the page. A first time 704 and a second time 706 are shown here. For ease of illustration, the first time 704 is shown as beginning at about 12:00 a.m. and extending until about 4:00 p.m. local time. Likewise, the second time 706 extends from about 4:00 p.m. to about 10:00 p.m. In other implementations, additional times may be designated.

The designation of the times may be made in some implementations by the delivery scheduling module 320 based at least in part on the delivery parameters 328. For example, the first time 704 may be an "off-peak" time during which the network 108 is uncongested and throughput is relatively high. Thus, the first time 704 may comprise a period during which data throughput to the streaming device 106 is above a pre-determined threshold. Likewise, the second time 706 may be a "peak" time during which the network 108 is congested and throughput is reduced due to contention for network resources.

Continuing the example, when the streaming device 106 is located in a residence and coupled to a broadband network, the first time 704 usage may be light because children are at school and parents are at work, both in the particular residence where the streaming device 106 is located and in that general geographic area as well. As children return from school and parents return from work, the second time 706 begins as demand for network 108 resources increases as children work on school work in the evening, parents work from home, and content is requested from the server 110.

During the first time 704, at 708 the server 110 delivers partial content 114 to the streaming device 106(1). This delivery of partial content 114 may be at the request of the user 102(1), or may be transferred to the user 102(1) based on a generated recommendation. The delivery scheduling module 320 may be configured to coordinate delivery of partial content 114 to multiple devices based on the networks 108 used to mitigate self-congestion. For example, the delivery scheduling module 320 may throttle the throughput to the streaming devices 106(1)-106(S) in a particular neighborhood to avoid interfering with delivery of the partial content 114 to those streaming devices 106(1)-106(S).

During the second time 706, such as when usage of the network 108 is at a peak and throughput is reduced due to congestion, at 710, the server 110 receives a request from the streaming device 106 to present complete content 118. For example, a child may have returned home from school and selected the movie "Travel the Orinoco!" to watch from a menu provided by the streaming device 106(1) via the presentation device 104(1).

At 712, the server 110 streams the remaining content 116 to the streaming device 106(1). The streaming may be done with or without acknowledgement by the streaming device 106. For example, in some implementations the streaming may involve a transmission protocol in which data is transferred and acknowledgements to data received by the streaming device 106 are provided such as transmission control protocol ("TCP"). In another implementation data may transmit without acknowledgement by the streaming device 106, such as with user datagram protocol ("UDP").

At 714, the streaming device 106 generates the complete content 118 based on the partial content 114 previously received and the stream of the remaining content 116. As described above, the remaining content 116 may include a timestamp or feature configured to render the remaining content 116 inoperative or otherwise unusable after a period of time. For example, the remaining content 116 may be usable for generating the complete content 118 for fifteen minutes before expiring. At 716, the streaming device 106 provides the complete content 118 to the presentation device 104, which presents the content to the user 102.

In some implementations, the streaming and presentation of the content may begin before the partial content 114 has been completely delivered. For example, during the first time 704, the partial content 114(1) is being delivered to the streaming device 106(1) and is only about 50% complete. The user 102(1) awakens and, unable to sleep, chooses to watch "Travel the Orinoco!" The streaming device 106(1) may begin presentation using the partial content 114 as delivered in conjunction with the remaining content 116 as described above. The delivery of the partial content 114 may continue contemporaneously with the streaming of the remaining content 116. Or, the server 110 may suspend delivery, and provide the remaining content 116 until the partial content 114 has been exhausted, whereupon the content may be streamed to the streaming device 106(1) for presentation. As this interaction is occurring during the first time 704, network throughput may be sufficient to support the transfer of data associated with streaming, which is desired to maintain a particular customer experience.

Figure 8:
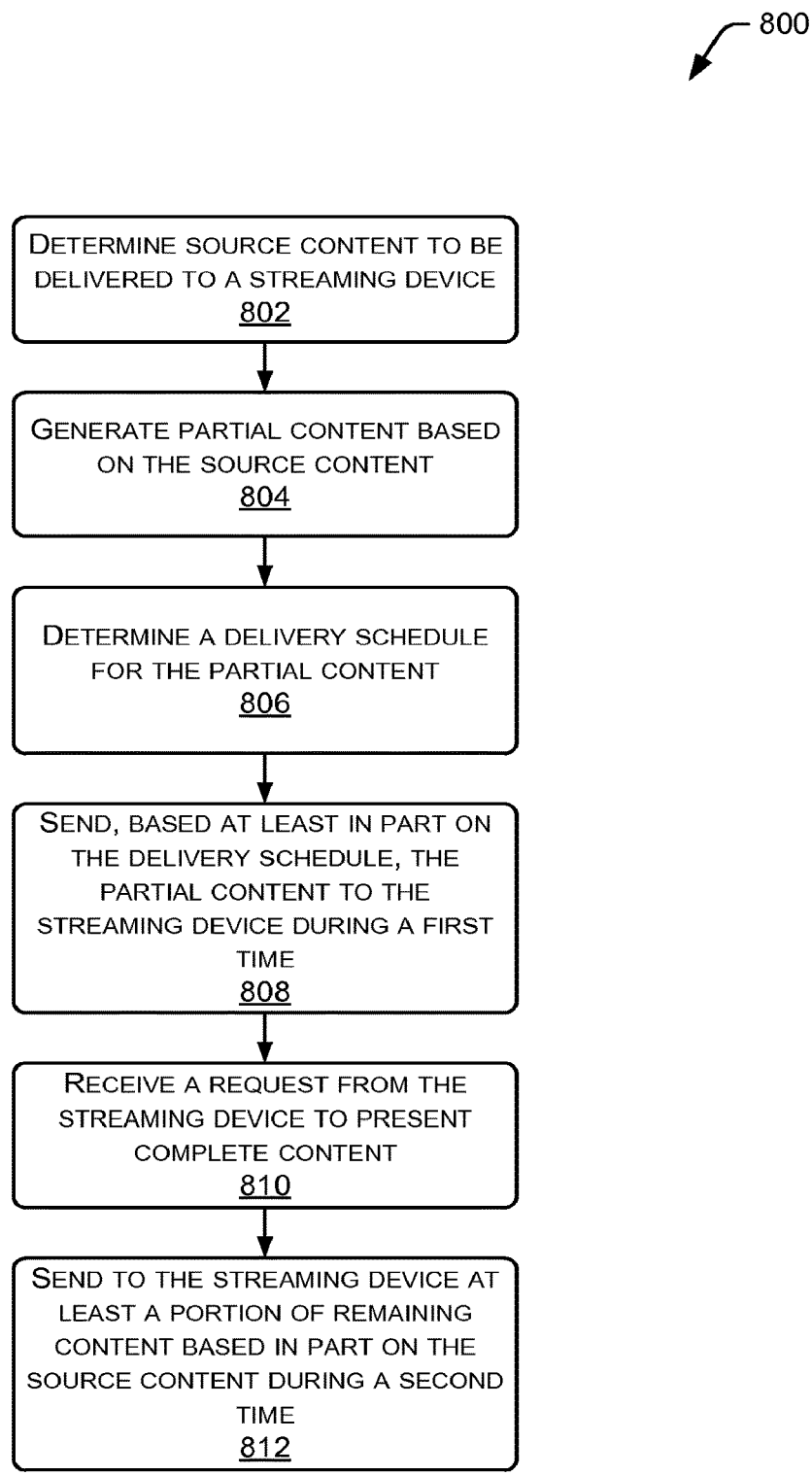
FIG. 8 illustrates a flow diagram of a process of delivering partial content and streaming remaining content in accordance with an embodiment of the disclosure.

FIG. 8 illustrates a flow diagram 800 of a process of delivering partial content 114 and streaming remaining content 116. In some implementations, this process may be performed at least in part by the content delivery module 316 of the server 110.

Block 802 determines source content 112 to be delivered to a streaming device 106. For example, as described above, the recommendation module 318 may determine what the user 102 associated with the streaming device 106 has selected for future presentation or may wish to have presented in the future.

Block 804 generates partial content 114 from the source content 112. As described above, in one implementation, the partial content generation module 322 may be configured to generate the partial content 114 such that the partial content 114 omits a plurality of portions of the source content 112.

Block 806 determines a delivery schedule for the partial content 114. As described above with regard to the delivery scheduling module 320, the delivery schedule may be based at least in part on one or more delivery parameters 328. For example, the delivery schedule may be configured to deliver partial content 114 during nighttime hours when network usage is minimal and greater throughput is available.

Block 808 sends, based at least in part on the delivery schedule, the partial content 114 to the streaming device 106. As described above, this delivery may occur during the first time 704. As also described above, in some implementations, the partial content 114 may be transferred between the streaming devices 106 using the LAN connection 202. In these implementations, the server 110 may be configured to approve a transfer of at least a portion of the partial content 114 from the first streaming device 106(1) to the second streaming device 106(2).

The partial content ratio may also be based at least in part on one or more of the delivery parameters 328 as described above. In one implementation, the partial content generated by block 806 and delivered in block 808 may have a partial content ratio based at least in part on projected data throughput to the device during the second time 706. For example, where the throughput during the second time 706 of peak usage is 100 kbps, the partial content ratio may be set such that the remaining content 116 when delivered would consume 100 kbps or less on the network 108 during that peak time.

Block 810 receives a request from the streaming device 106 to present the complete content 118. For example, the user 102(1) may select content for presentation, the selection may generate request data which is transferred to the server 110 via the network 108. In some implementations the request may be omitted. For example, presentation may be scheduled to begin at a pre-determined time. In other implementations, the request may be provided by another device, such as a computer controlled entertainment system within a home.

Block 812 sends at least a portion of the remaining content 116 to the streaming device 106 by streaming over the network 108. This streaming may occur at the second time 706, such as during peak times. As described above, the remaining content 116 corresponds to the partial content 114 on the streaming device 106. In some implementations, the remaining content 116 may be provided by the same server 110 as the partial content 114, or by a different server 110.

Figure 9:
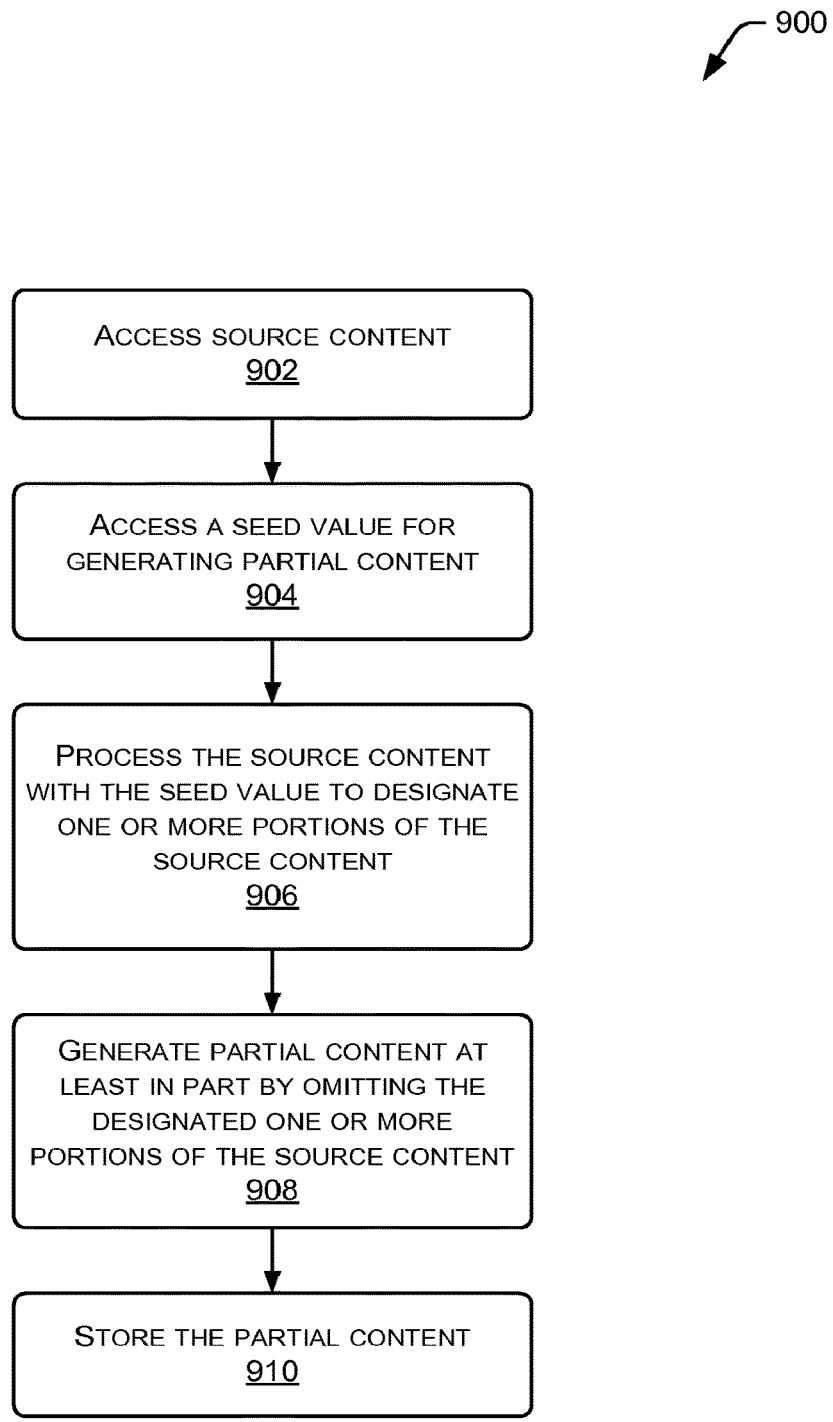
FIG. 9 illustrates a flow diagram of a process of generating partial content in accordance with an embodiment of the disclosure.

FIG. 9 illustrates a flow diagram 900 of a process of generating the partial content 114. The partial content generation module 322 and the seed module 324 may be configured to provide this functionality in some implementations.

Block 902 accesses the source content 112. This may be source content 112 which has been determined for delivery by the delivery scheduling module 320.

Block 904 accesses a seed value 330 for generating the partial content 114. This seed value 330 may be previously determined or generated on demand. The seed value 330 may be associated with one or more of a user identifier corresponding to a particular user account, a device identifier corresponding to a particular streaming device 106, or a content identifier corresponding to a particular piece of source content 112.

Block 906 processes the source content 112 with one or more of the seed values 330 to designate one or more portions of the source content 112. For example, the seed value 330 may be used as an input to a function which will select particular blocks throughout the source content 112. The one or more portions may be distributed or dispersed irregularly throughout the partial content 114, relative to the source content 112, and comprise variable bit lengths. By analogy, the "holes" may be of different sizes and distributed irregularly relative to the source content 112.

Block 908 generates the partial content 114 at least in part by omitting the designated plurality of portions of the source content. In other implementations, as described above, the designated plurality of portions may be selectively encrypted, replaced with obfuscating data, and so forth.

Block 910 stores the partial content 114 which omits the designated plurality of portions. Continuing the analogy, as depicted in the figures, the partial content 114 as stored contains "holes" in the data relative to the source content 112.

Figure 10:
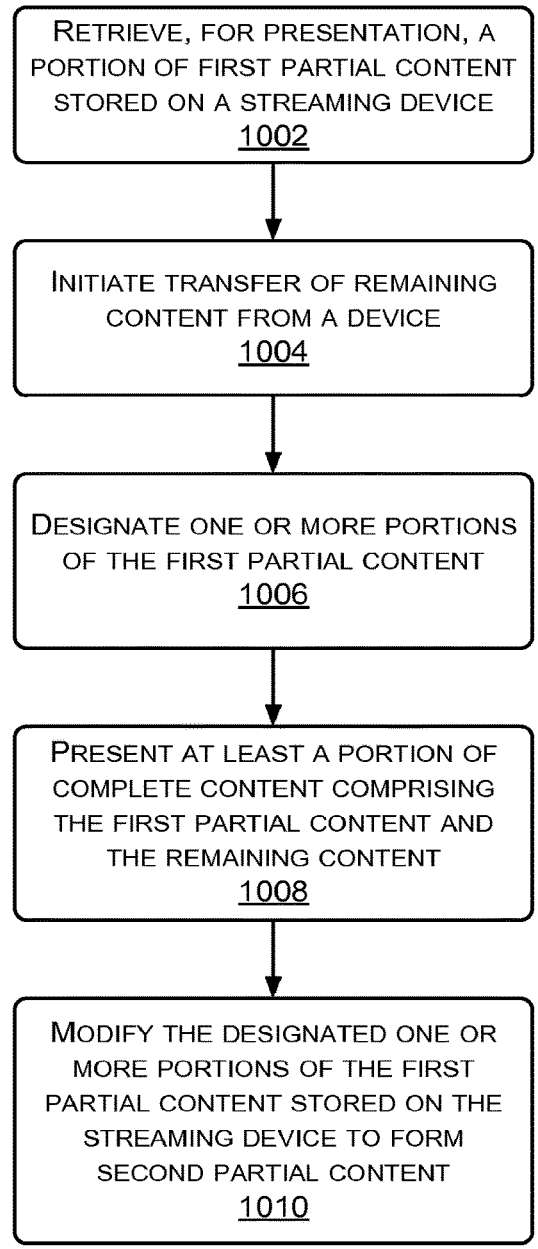
FIG. 10 illustrates a flow diagram of a process of generating partial content in accordance with an embodiment of the disclosure.

FIG. 10 illustrates a flow diagram 1000 of a process of generating the partial content 114. This process may be provided by the content presentation module 514 of the streaming device 106 in some implementations.

To improve security of the content, in some implementations the presentation process by the streaming device 106 may be configured to generate new partial content which is based at least in part on existing partial content in addition to combining and presenting the content. As a result, the partial content 114 stored on the device after presentation has begun would differ from the partial content 114 stored on the device before presentation.

Block 1002 receives from the secondary memory 504(2) for presentation a portion of a first partial content 114(1) comprising a partial representation of source content 112(1) as described above.

Block 1004 initiates a streaming transfer of the remaining content 116 associated with the first partial content 114(1). As described above, only a portion of the remaining content 116(1) is stored on the streaming device 106(1) at a given time.

Block 1006 designates one or more portions of the first partial content 114(1). As described above with regard to the generation of the partial content 114(1), this may be done using the seed value 330 in some implementations. The seed value 330 may be provided by the server 110, the streaming device 106, or a combination of the two.

Block 1008 presents at least a portion of the complete content 118(1) comprising the first partial content 114(1) and the remaining content 116(1).

Block 1010 modifies the designated one or more portions of the first partial content 114(1) stored in secondary memory 504(2) to generate second partial content 114(9). As described above, this modification may include removing or deleting data, replacing with obfuscating data, encrypting, and so forth. Once modified, the partial content 114(9), while still a portion of the source content 112, now contains different data compared to the partial content 114(1).

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one memory storing computer-executable instructions; and
   at least one processor configured to access the at least one memory and execute the computer-executable instructions to:
   determine network information including a wireless network identifier of a wireless network and access credentials for accessing the wireless network, wherein the wireless network is accessible at a location where a streaming device will be used;
   determine first content associated with user data;
   establish an initial configuration of the streaming device using the network information, the initial configuration enabling the streaming device to access the wireless network;
   generate, prior to shipment of the streaming device, partial content and remaining content from the first content, the partial content and the remaining content comprising audio or video content, wherein the partial content includes a first portion of the content, the remaining content including a second portion of the content, the partial content being configured to be unusable for presentation at the streaming device without at least a portion of the remaining content, and the remaining content comprising presentable content configured to be unusable for presentation at the streaming device without at least a portion of the partial content, wherein the partial content is combinable with the remaining content by the streaming device to form a presentable file corresponding to the first content, wherein the presentable file comprises the audio or video content, and the partial content uses a filename extension indicating that an associated media file comprises the partial content, the associated media file being different from the presentable file; and
   store the partial content on the streaming device prior to the shipment of the streaming device.

2. The system of claim 1, wherein the network information is received as part of an online purchase transaction of the streaming device.

3. The system of claim 1, wherein the at least one processor is further configured to execute the computer-executable instructions to:
   receive, from the streaming device, a request for the remaining content; and
   initiate transfer of the remaining content to the streaming device.

4. The system of claim 1, wherein the at least one processor is being configured to generate the partial content by executing the computer-executable instructions to:
   determine a predetermined quantity of data; and
   generate an amount of the partial content corresponding to the predetermined quantity of data.

5. The system of claim 1, wherein the partial content comprises an incomplete representation of an audio file, wherein the remaining content is complementary to the incomplete representation.

6. The system of claim 1, wherein the filename extension is a first filename excision, and the presentable file is associated with a second filename extension indicating the presentable file comprises the audio or video content.

7. A method comprising:
   determining network information for accessing a wireless network, wherein the wireless network is accessible at a location where a streaming device will be used;
   determining, prior to shipment of the streaming device, an initial configuration for the streaming device using the network information;
   configuring, prior to the shipment of the streaming device, the streaming device using the initial configuration;

determining, prior to the shipment of the streaming device, partial content and remaining content from first content associated with user data, the partial content and the remaining content comprising audio or video content, wherein the partial content is configured to be unusable for presentation at the streaming device without at least a portion of the remaining content, and the remaining content comprising presentable content configured to be unusable for presentation at the streaming device without at least a portion of the partial content, wherein the partial content is combinable with the remaining content by the streaming device to form a presentable file corresponding to the first content, wherein the presentable file comprises the audio or video content, and the partial content has a filename extension indicating that an associated media file comprises the partial content, the associated media file being different from the presentable file; and storing the partial content on the streaming device prior to the shipment of the streaming device.

8. The method of claim 7, wherein the network information is received as part of an online purchase transaction of the streaming device.

9. The method of claim 7, wherein the user data is associated with a purchaser of the streaming device.

10. The method of claim 7, further comprising:
receiving, from the streaming device, a request for the remaining content; and
initiating transfer of the remaining content to the streaming device.

11. The method of claim 7, wherein storing the partial content on the streaming device comprises:
determining a predetermined quantity of data; and
generating an amount of the partial content corresponding to the predetermined quantity of data.

12. The method of claim 7, wherein determining the partial content from the content comprises:
determining a content queue based at least in part on the user data; and
generating the partial content based at least in part on the content queue.

13. The method of claim 7, wherein determining the partial content from the content comprises:
determining recommended content based at least in part on the user data; and
generating the partial content based at least in part on the recommended content.

14. A system, comprising:
at least one memory storing computer-executable instructions; and
at least one processor configured to access the at least one memory and execute the computer-executable instructions to:
determine user data associated with a purchaser of a streaming device;
determine, prior to shipment of the streaming device, an initial configuration for the streaming device;
configure, prior to the shipment of the streaming device, the streaming device using the initial configuration;
determine, prior to the shipment of the streaming device, partial content and remaining content from first content associated with the user data, the partial content being configured to be unusable for presentation at the streaming device without at least a portion of the remaining content, and the remaining content comprising presentable content configured to be unusable for presentation at the streaming device without at least a portion of the partial content, wherein the partial content is combinable with the remaining content by the streaming device to form a presentable file corresponding to the first content, wherein the presentable file comprises the audio or video content, and the partial content has a filename extension indicating that an associated media file comprises the partial content, the associated media file being different from the presentable file; and
store the partial content on the streaming device prior to the shipment of the streaming device.

15. The system of claim 14, wherein the at least one processor is further configured to execute the computer-executable instructions to receive the initial configuration during purchase of the streaming device from an online merchant.

16. The system of claim 14, wherein the at least one processor is further configured to execute the computer-executable instructions to:
determine a content queue based at least in part on the user data; and
generate the partial content based at least in part on the content queue.

17. The system of claim 14, wherein the at least one processor is further configured to execute the computer-executable instructions to:
determine recommended content based at least in part on the user data; and
generate the partial content based at least in part on the recommended content.

18. The system of claim 14, wherein the at least one processor is further configured to execute the computer-executable instructions to:
determine a predetermined quantity of data; and
generate an amount of the partial content corresponding to the predetermined quantity of data.

19. The system of claim 14, wherein the initial configuration comprises network settings comprising settings for a wireless network at a location where the streaming device will be used.

20. The system of claim 14, wherein the first content is a type of media file and wherein the partial content combined with the portion of the remaining content is indicative of the type of media file.

* * * * *